(12) United States Patent
Sasaki et al.

(10) Patent No.: US 6,948,075 B2
(45) Date of Patent: Sep. 20, 2005

(54) COMPUTER CONTROLLING METHOD, INFORMATION APPARATUS, COMPUTER, AND STORAGE MEDIUM

(75) Inventors: Ken Sasaki, Yamato (JP); Yasuhito Shimizu, Yamato (JP); Hidetoshi Mori, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 661 days.

(21) Appl. No.: 09/898,115

(22) Filed: Jul. 3, 2001

(65) Prior Publication Data

US 2002/0091920 A1 Jul. 11, 2002

(30) Foreign Application Priority Data

Jul. 7, 2000 (JP) ........................................ 2000-206525

(51) Int. Cl.[7] .................... G06F 11/30; G06F 12/14; H04L 9/00; H04L 9/32
(52) U.S. Cl. ........................ 713/201; 713/2; 713/202
(58) Field of Search .......................... 713/201, 2, 202, 713/200

(56) References Cited

U.S. PATENT DOCUMENTS

| | | | | |
|---|---|---|---|---|
| 5,224,160 A | * | 6/1993 | Paulini et al. | 713/187 |
| 5,537,544 A | * | 7/1996 | Morisawa et al. | 713/202 |
| 5,557,742 A | * | 9/1996 | Smaha et al. | 713/200 |
| 5,896,497 A | * | 4/1999 | Halstead | 713/200 |
| 6,049,871 A | * | 4/2000 | Silen et al. | 713/2 |
| 6,202,158 B1 | * | 3/2001 | Urano et al. | 713/201 |

* cited by examiner

*Primary Examiner*—Albert DeCady
*Assistant Examiner*—Shewaye Gelagay
(74) *Attorney, Agent, or Firm*—Thomas A. Beck; Louis P. Herzberg (57) ABSTRACT

The present invention provides a control method for notification of tampering of information apparatus, a computer, and/or a storage medium. It provides a technique for storing information related to a starting factor of the information apparatus and/or the computer, as well as notifying a certified user of the information apparatus and/or the computer of the information, thereby reporting and/or preventing the information apparatus and/or the computer from an illegitimate and/or illegal use. It enables a user to know that a computer or other information apparatus has been used and/or tampered by an uncertified user.

19 Claims, 10 Drawing Sheets

| Login Date, Time | Installed Password | Input Password | Pass | Boot | Input Device |
|---|---|---|---|---|---|
| 11/10/1999 10:00 | PAP/POP | – | NG | – | Keyboard |
| 11/10/1999 10:00 | PAP/POP | – | NG | – | Keyboard |
| . . | | | | | |
| 11/10/1999 10:00 | PAP/POP | POP | OK | Normal | Keyboard |
| 11/11/1999 10:00 | PAP/POP | POP | OK | Reference Disk | Keyboard |
| 11/12/1999 09:30 | PAP/POP | PAP | OK | Setup | Keyboard |
| 11/12/1999 10:00 | NONE | NONE | OK | Normal | NONE |
| 11/12/1999 10:00 | POP | POP | OK | Normal | Finger Print |
| . | | | | | |

| Login Date, Time | Installed Password | Input Password | Pass | Boot | Input Device |
|---|---|---|---|---|---|
| 11/10/1999 10:00 | PAP/POP | — | NG | — | Keyboard |
| 11/10/1999 10:00 | PAP/POP | — | NG | — | Keyboard |
| . . | . . | | | | |
| 11/10/1999 10:00 | PAP/POP | POP | OK | Normal | Keyboard |
| 11/11/1999 10:00 | PAP/POP | POP | OK | Reference Disk | Keyboard |
| 11/12/1999 09:30 | PAP/POP | PAP | OK | Setup | Keyboard |
| 11/12/1999 10:00 | NONE | NONE | OK | Normal | NONE |
| 11/12/1999 10:00 | POP | POP | OK | Normal | Finger Print |
| . . | . . | | | | |

Fig. 4

TYPES OF STARTUP FACTORS

- Power-on (Normal)
- Resume from Suspend (Resume)
- Wake-up from Hibernation (Hibernation)
- Remote Boot by Network (Network)
- Boot by Reference Disc (Reference Disc)
- Setup Menu (Setup)

TYPES OF PASSWORDS

- Supervisor Password (PAP)
- Power-on Password (POP)
- HDD password (HDP)
- None (No setting)

Fig. 5

| Login Date, Time | Installed Password | Input Password | Pass | Boot |
|---|---|---|---|---|
| 0  07/06/2000 09:00 | NONE | NONE | OK | Normal |
| 1  07/06/2000 23:00 | NONE | NONE | OK | Normal |
| 2  08/06/2000 08:30 | NONE | NONE | OK | Normal |

Fig. 6

| Login Date, Time | Installed Password | Input Password | Pass | Boot |
|---|---|---|---|---|
| 0 | 07/06/2000 09:00 | PAP/POP | POP | OK | Normal |
| 1 | 07/06/2000 23:00 | PAP/POP | POP | OK | Normal |
| 2 | 08/06/2000 08:30 | PAP/POP | POP | OK | Normal |

Fig. 7

| | Login Date, Time | Installed Password | Input Password | Pass | Boot |
|---|---|---|---|---|---|
| 0 | 07/06/2000 09:00 | PAP/POP | POP | OK | Normal |
| 1 | 07/06/2000 23:00 | PAP/POP | PAP | OK | Setup |
| 2 | 08/06/2000 08:30 | PAP/POP | POP | OK | Normal |

Fig. 8

| Login Date, Time | Installed Password | Input Password | Pass | Boot |
|---|---|---|---|---|
| 0 | 07/06/2000 09:00 | NONE | NONE | OK | Normal |
| 1 | 07/06/2000 23:00 | NONE | NONE | OK | Network |
| 2 | 08/06/2000 08:30 | NONE | NONE | OK | Normal |

COMPUTER CONTROLLING METHOD, INFORMATION APPARATUS, COMPUTER, AND STORAGE MEDIUM

FIELD OF THE INVENTION

The present invention provides methods, apparatus and systems for storing information related to starting factors and their occurrences for starting information apparatus, storage medium and/or a computer. It provides for notifying a certified user of the information apparatus, storage medium and/or the computer of information related to an illegal and/or a illegitimate tamper or use.

BACKGROUND

Recent enhancement and diversification of information apparatus such as computers are indeed remarkable. As the capacity of such a storage as an HDD (hard disc drive) used for each of such computers is expanded more and more, the user of the computer usually stores his/her information in the computer. On the other hand, computers installed in offices are now placed under possibility of illegitimate and/or illegal accesses from uncertified users. This has lead to a problem that the information stored in the computer is sometimes read and rewritten by uncertified users.

In order to prevent a computer from such illegitimate and/or illegal uses, therefore, there is a well-known method that uses passwords. A password for a certified user is set in the subject computer beforehand, so that the computer is started up only when the password entered at the time of powering the computer is identical to a preset stored password.

PROBLEMS TO BE SOLVED BY THE INVENTION

However, even when a certified user manages his/her password by himself/herself, there is still a possibility that the password might be leaked to a person who attempts an illegitimate and/or illegal use of the computer. It is reported that about 70% of the crimes caused by such illegal uses of computers are done by fellow workers, who may find it easy to know the passwords of others. Consequently, it is easy for such a fellow worker to erase or rewrite information stored by a certified user in the computer. Of course, such erasing and rewriting of information is also done by people outside the computer's facility who are so-called "hackers."

Often, when information stored in a computer is tampered such as being erased or rewritten, the certified user cannot know the fact immediately. Concretely, the certified user can know that fact only after he/she attempts using the erased or rewritten information. Furthermore, in the case when the information is rewritten just partially, the certified user may overlook the rewriting and keep using the information as is.

Personal computers (PC) are often used as terminals of a LAN (Local Area Network). For such a LAN, a supervisor is appointed, so that the supervisor manages the network. The supervisor, who has carried out maintenance work as updating of a set data in each PC, might neglect to provide notification of the tampering fact to the certified users. In such a case, the certified users keep using their PCs without knowing the updated data, which then causes a problem that they cannot operate their PCs smoothly.

SUMMARY OF THE INVENTION

In order to overcome the problems described it is an aspect of the present invention to provide a computer managing method, an information apparatus, and/or a storage medium to recognize a possibility that an information apparatus, as a computer, is accessed illegitimately and/or illegally or the set data is modified by learning the fact that the information apparatus is accessed by an uncertified person or entity.

BRIEF DESCRIPTION OF THE DRAWINGS

These and other objects, features, and advantages of the present invention will become apparent upon further consideration of the following detailed description of the invention when read in conjunction with the following drawing figures, in which.

DESCRIPTION OF SYMBOLS

10 . . . Computer system
12 . . . PC
14 . . . CPU
28 . . . Liquid crystal display (LCD)
50 . . . EEPROM

DETAILED DESCRIPTION OF THE INVENTION

A computer has several types of starting and/or restarting factors. These include normal power-on, resuming from suspend mode, wake-up from hibernation mode, remote booting from a network, etc.

In the case when a computer employs an illegal access preventing method that uses a password, the user is required to enter the password each time the computer is started up. In the case when a network is configured by computers, the network has a supervisor password.

Consequently, in the case when a certified user can know information related to the starting of the computer, it will be possible for the certified user to know an illegal access to the computer from an uncertified person. For example, in the case when the computer is started up after the certified user turns off the power supply of the computer at the end of his/her work for a day, it is possible to identify the illegal use of the computer from an uncertified person.

The present invention is achieved on the basis of the concept as described above so as to provide a computer controlling method for obtaining a starting factor instructed to a computer, information of an environment in which the starting factor is instructed, and storing those information items in storage means so that those stored information items are notified to the user when the computer is started up next.

According to the computer controlling method of the present invention, both starting factor and starting environment-related information of a subject computer are stored. Consequently, using the starting factor and the starting environment-related information makes it possible for the user to know whether or not the computer is accessed by an uncertified third person.

Furthermore, according to the computer controlling method of the present invention, because the certified user is notified of starting-related information from the computer, the user can check the use of the computer from a third person including an illegal access.

For the computer controlling method of the present invention, various notification methods that can be realized by a computer may be employed as described above. For example, the information to notify is displayed as characters on a display device, output as voices, or printed out. The notification is not limited to only once; it can be made many times. In addition, the notification timing can be varied freely, but it should preferably be done just after the computer is started up. For a PC, the notification should preferably be done when the BIOS (Basic Input/Output System) is executed.

The startup information to be notified is not limited only to the last startup information; it may include the startup information before the last and the current startup information. This is because notification of the startup-related history is effective to check the use of the computer by third persons including illegal uses.

For the computer controlling method of the present invention, it is effective to include a starting factor of the computer and information related to an environment in which the starting factor is instructed. In this case, both of the computer starting factor and the information related to the environment should be related with each other before they are notified to the user. This is because these information items, when related with each other as described above, are easier to be analyzed than when they are notified at random. More preferably, in the case when the information related to the environment includes information of a date and time at which the computer starting factor is instructed, the computer starting factor and the starting factor instructed environment information are related with each other and these information items are displayed on the display means in order of date and time information. In the case when both starting factor and information related to the environment are displayed such way, it is easy to check the use of the computer from uncertified persons.

As described above, the computer has several types of starting factors, such as normal power-on, resuming from suspend mode, wake-up from hibernation mode, remote booting by a network, booting by a reference disc, and booting from the setup menu. The computer controlling method of the present invention can identify any of these starting factors when the computer is started up.

The environment in which the starting factor is instructed can include information of a date and time at which the starting factor is instructed. In the case when starting of the computer is designated while the certified user does not use the computer, the designated starting of the computer might be an illegal access. Consequently, such an illegal access can be checked easily by referencing to the starting factor and the date and time information. The computer controlling method of the present invention therefore should preferably store information of a date and time at which a starting factor is designated in the storage means so that the certified user can reference to them as needed.

And, the present invention makes it possible to include a type of the identification information related to the computer user as an environment in which a starting factor is designated. In the case when such an identification information (ex., a password) related to a computer user is set for the computer, the computer can be started up legally only when correct identification information is entered. Several types may be set for this identification information of the computer. For example, the identification information includes that set for each certified user of the computer, that set for the supervisor of the computer, etc. In the case when a plurality of such identification information items are set for a computer such way, the type of the identification information used for starting the computer is used to identify persons other than the certified users. In the case when the computer is started up with use of the identification information of a certified user while he/she does not access the computer, it can be confirmed that the identification information has been leaked and used illegally. And, in the case when the computer is started up with use of the identification information of the supervisor while no certified user accesses the computer, it can be confirmed, for example, that the supervisor has started up the computer so as to modify the computer system or his/her identification information has been leaked and used illegally. Consequently, types of the identification information related to the computer users should preferably be stored in the storage means so that certified users can reference to their types of identification information as needed.

An identification information type may be an identification information item, for example, a password itself. However, it is not limited only to such information; it may be any information that can distinguish easily among a plurality of such set identification information items. For example, it is possible to employ a system that can identify a certified user with his/her finger print, voice pattern, etc. In such a case, a device to which the identification information is entered should preferably be handled as information related to an environment in which a starting factor is designated.

According to the present invention, therefore, it is possible to include information that suggests an input of uncertified identification information as an environment in which a starting factor is designated. For example, sometimes starting of a computer to which a password is set might be stopped due to an illegal password entered by a third person for an illegal access. In such a case, an illegal access to the computer can be prevented in the case when the certified user can know the fact of the illegal access. Consequently, the computer controlling method of the present invention should preferably enable information that suggests an input of uncertified identification information to be stored in the storage means so that the certified user can reference to the information as needed.

As described above, the information apparatus of the present invention includes storage means; starting factor managing means for recognizing a starting factor designated thereto and storing the starting factor in the storage means;

date and time information managing means for storing information of a date and time at which the starting factor is designated in the storage means; and notifying means for notifying the user of the information apparatus of both starting factor and date and time information stored in the storage means. This means that the information apparatus of the present invention makes it possible to execute the information apparatus controlling method of the present invention as described above.

The information apparatus of the present invention can further include identification information managing means for certifying the identification information of a person who has designated starting of the information apparatus, discriminating the type of the identification information, and storing the discriminated type of the identification information in the storage means. In this case, the notifying means can notify the certified user of the starting factor, the date and time information, and the type of the identification information read from the storage means respectively. The certified user can thus know whether or not there is any third person who has accessed the apparatus illegally according to this notified information.

As described above, the computer of the present invention includes storage means; date and time information managing means for storing date and time information for each designation of starting to the computer in the storage means; identification information managing means for discriminating identification information entered when the computer is started up and storing the discriminated identification information in the storage means; and display means for displaying at least the date and time information stored in the storage means. Since the date and time information and the identification information are displayed by this computer, it is possible to easily check whether or not there is any third person who has accessed the computer illegally according to this displayed information.

The date and time information managing means and the identification information managing means of the computer of the present invention should preferably be able to operate on the BIOS of the computer. Generally, the BIOS can operate even when the computer is infected with a computer virus. It is thus possible to check a date and time, etc. at which the computer is accessed illegally and/or infected with a computer virus in case the date and time information managing means and the identification information managing means of the computer are designed so as to operate on the BIOS of the computer.

Furthermore, the computer of the present invention should preferably enable the identification information managing means to store a predetermined type of identification information and discriminate the type of entered identification information and the display means to display date and time information, the type of identification information registered beforehand, and the type of entered identification information so that these information items are related with each another. And preferably, the computer should further include starting factor managing means for recognizing a starting factor of the computer and storing the starting factor in the storage means so that the display means can display the date and time information, the type of the identification information registered beforehand, the type of entered identification information, and the starting factor related with each another.

Furthermore, the present invention provides a computer provided with input means for designating a predetermined processing; and display means for displaying the history of starting-related information items in order of dates and times. According to this computer, because the history of starting-related information items are displayed on the display means in order of dates and times in response to a designation from such an input means as a keyboard, etc., the certified user can check accesses of a third person including illegal uses of the computer. Especially, in the case when the starting-related information includes information of a date and time at which a starting is designated to the computer and the type of identification information entered to the computer, such a check is more effective.

Furthermore, the present invention provides a computer provided with storage means; managing means for storing a starting factor designated thereto and information of an environment in which the starting factor is designated in the storage means; reading means for reading both starting factor and information related to the environment from the storage means while the BIOS of the computer is operated; and display means for displaying both starting factor and information related to the environment read by the reading means.

The reading means of the computer can read both of a starting factor and information related to an environment in response to a designation from the setup menu of the BIOS.

The storage medium of the present invention stores a program for enabling the computer to execute processes including those in a storing step of obtaining a starting factor designated to the computer and information related to an environment in which the starting factor is designated and storing these information items in the storage means and a notifying step of notifying a certified user of the starting factor and the information related to the environment read by the reading means for the next startup of the computer. Consequently, it is easy for the certified user to check if the computer is accessed illegally, since the computer reads and executes the program from this storage medium.

Advantageous Embodiments]

Figure 1:
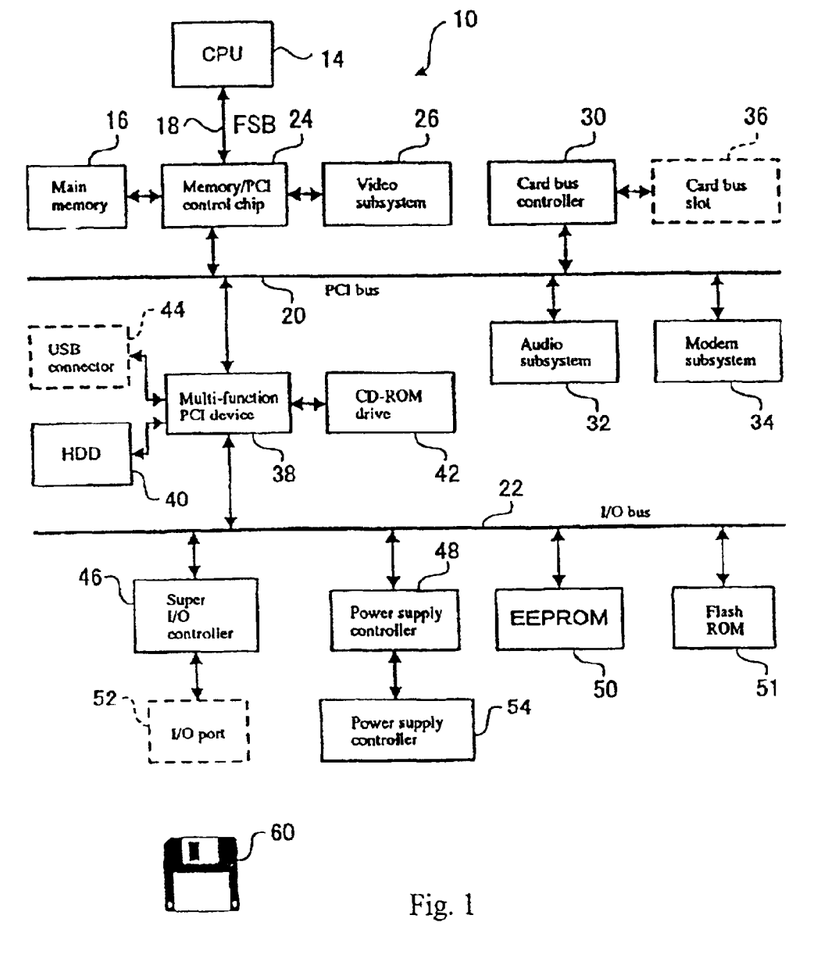
FIG. 1 shows a schematic block diagram of a computer system according to an embodiment of the present invention.
Figure 10:
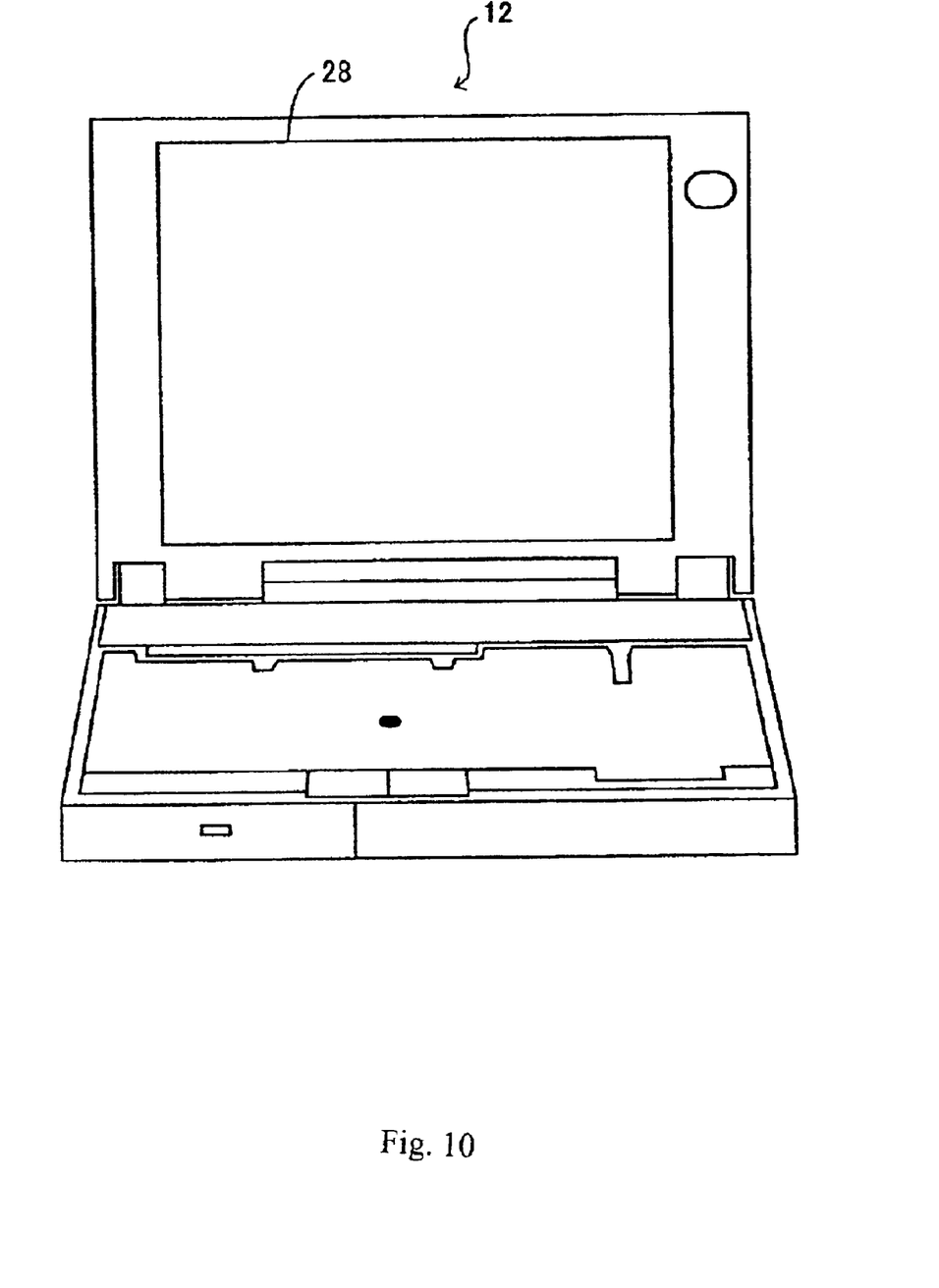
FIG. 10 shows a schematic front view of a laptop PC, according to the present invention.

Hereunder, an example of the embodiment of the present invention will be described with reference to the accompanying drawings. FIG. 1 is an explanatory view of a computer system 10 configured by a typical PC in a hardware block diagram preferred to realize the present invention. The PC for realizing the present invention is, for example, a laptop PC 12 (see FIG. 10) conforming to the specification of the OADG (PC Open Architecture Developer's Group), in which "Windows 98, NT, or 2000" (Microsoft USA) or "OS/2" (IBM USA) is installed as the operating system (OS). Hereinafter, each part of the computer system 10 will be described.

A CPU 14, which is the brain of the whole computer system 10, executes various programs under the control of the OS. The CPU 14 may be, for example, "Pentium," "MMX technology Pentium," or "Pentium Pro," which are CPU chips of Intel USA or a CPU of any other companies such as AMD Inc. or the like. The CPU 14 may also be "Power PC," which is a CPU chip of IBM Inc. The CPU 14 is configured so as to include an L2 (level 2)-cache, which is a fast operation memory used to store some of the codes and data that are frequently accessed so as to reduce the total access time to a main memory 16. Generally, the L2-cache is configured by an SRAM (Static RAM) chip and its storage capacity is, for example, 512 kB or over.

The CPU 14 is connected to each of the hardware components of the computer system 10 via a three-layer bus, which is an I/O bus 22 configured by an FSB 18, which is a bus connected directly to the CPU external pins, a PCI (Peripheral Component Interconnect) bus 20, which is a fast I/O device bus, and an ISA (Industry Standard Architecture) bus, which is a slow I/O device bus, etc.

The FSB 18 and the PCI bus 20 are connected to each other via a bridge circuit (host—PCI bridge), which is generally referred to as a memory/PCI control chip 24. The memory/PCI control chip 24 in this embodiment includes a memory controller function for controlling an access to the main memory 16, a data buffer for absorbing a difference of the data transfer rate between the FSB 18 and the PCI bus 20, etc. The memory/PCI control chip 24 may be, for example, 440EX, 440GX, or the like (Intel USA).

The main memory 16 is a writable memory used as an area for reading an execution program of the CPU 14 or as a work area for writing data processed by the execution program. Generally, the main memory 16 is configured by a plurality of DRAM (Dynamic RAM) chips. The main memory 16 can have, for example, 32 MB as standard and be expanded up to 256 MB. In recent years, such the DRAM is shifted to a fast page DRAM, an EDO DRAM, a synchronous DRAM (SDRAM), a burst EDO DRAM, an RDRAM, etc., so as to meet the requirements of faster operations.

An execution program mentioned above includes such firmware as operation systems (OS) of Windows 98, etc., various device drivers for operating the hardware of peripheral devices, application programs dedicated to specific business works, a BIOS (Basic Input/Output System: a program for controlling the I/O operations of such hardware devices as a keyboard, a floppy disc drive, etc.) stored in the flash ROM 51 (to be described later in detail).

The PCI bus 20 can transfer data comparatively faster (ex., bus width: 32/64 bits, max. operation frequency: 33/66/100 MHz, max. data transfer rate: 132/264 MBps) and it is connected to such PCI devices as a card bus controller 30 that is driven comparatively faster. The PCI architecture is proposed initially by Intel USA Inc. and it realizes a so-called PnP (plug and play) function.

The video subsystem 26 is used to realize video-related functions. The video subsystem 26 includes a video controller that processes a drawing instruction received actually from the CPU 14 and writes the processed drawing information in the video memory (VRAM) once, as well as reads the drawing information from the VRAM so as to output the information to a liquid crystal display (LCD) 28 (see FIG. 10) as drawing data. The LCD 28 is the display means described above. The video controller can convert digital video signals to analog video signals via its digital-analog converter (DAC). Analog video signals are output to a CRT port (not illustrated) via a signal line.

The PCI bus 20 is also connected to a card bus controller 30, an audio subsystem 32, and a modem subsystem 34 respectively. The card bus controller 30 is a dedicated controller used to connect bus signals of the PCI bus 20 directly to the interface connector (card bus) of the PCI card bus slot 36. In the card bus slot 36 provided on, for example, the wall surface of the PC 12 body, is loaded a PC card (not illustrated) conforming to the specification (ex., "PC Card Standard 95") decided by PCMCIA (Personal Computer Memory Association)/JEIDA (Japan Electronic Industry Development Association).

The PCI bus 20 and the I/O bus 22 are connected to each other via a multifunction PCI device 38. The multifunction PCI device 38 is provided with a bridging function for the bridge between the PCI bus 20 and the I/O bus 22, a DMA controller function, a programmable interruption controller (PIC) function, a programmable interval timer (PIT) function, an IDE (Integrated Drive Electronics) interface function, a USB (Universal Serial Bus) function, and an SMB (System Management Bus) interface function. The multifunction PCI device 38 may be, for example, an Intel device referred to as the PIIX4.

The DMA controller function is used to transfer data between a peripheral device (ex., FDD) and the main memory 16 so that the transfer is not mediated by the CPU 14. The PIC function is used to execute a predetermined program (interruption handler) in response to an interruption request (IRQ) received from a peripheral device. The PIT function is used to generate a timer signal at predetermined cycles and the signal generation cycle is programmable.

The IDE interface realized by the IDE interface function is connected to an IDE hard disc drive (HDD) 40 and an IDE CD-ROM drive 42 via an ATAPI (AT Attachment Packet Interface). Instead of the IDE CD-ROM drive 42, another type IDE device such as a DVD (Digital Video Disc or Digital Versatile Disc) drive may be connected to itself. Such external storage devices as the HDD 40, the CD-ROM drive 42, etc. are housed, for example, in a place referred to as a "media bay" or "device bay" in the PC 12 body. these external storage devices provided as standard may be attached so as to be replaced with and exclusively from such other devices as an FDD, a battery pack, etc.

The multifunction PCI device 38 is provided with a USB port. This USB port is connected to a USB connector 44 provided, for example, on the wall surface of the PC 12 body. The USB supports a function for connecting/disconnecting a new peripheral device (USB device) while the computer is powered (hot plugging function) and a function for recognizing a newly connected peripheral device automatically and resetting the system configuration (plug and play function). One USB port can connect 63 USB devices in total in a daisy-chain connection manner. USB devices are, for example, a keyboard, a mouse, a joy stick, a scanner, a printer, a modem, a display monitor, a tablet, etc.

The data transfer rate of the I/O bus 22 is lower than that of the PCI bus 20 (for example, bus width: 16 bit, max. data transfer rate: 4 MBps). And, the I/O bus 22 is used for peripheral devices (not shown) which are operated at a relatively low speed, such as the real time clock (RTC) and the keyboard/mouse controller in addition to the super I/O controller 46, the power supply controller 48, the EEPROM 50, and the flash ROM 51.

The super I/O controller 46 connected to an I/O port 52 is a peripheral device controller for driving the floppy disc drive (FDD) and controlling the input/output of parallel data via a parallel port (PIO) and the input/output of serial data via a serial port (SIO).

The power supply controller 48 is mainly used for power management and thermal management of the computer system 10. The controller 48 may be configured by a single chip microcomputer provided with an MPU, a RAM, a ROM, a timer, etc. The ROM stores programs and reference tables required for executing both power management and thermal management described above. The power supply controller 48 is connected to a power supply controller 54. The power supply controller 54 includes a battery charger and a DC/DC converter used to generate such DC voltages as 5V, 3.3V, etc., required for the computer system 10. The power supply controller 54 controls such the electric powers under the control of the power supply controller 48.

Furthermore, the EEPROM 50 is a nonvolatile memory for storing registered passwords and other information related to the starting of the computer to be described later. Stored data in the EEPROM 50 can be rewritten electrically. In this embodiment, the EEPROM 50 can be divided into a plurality of blocks and stored data in each block can be locked (protected from rewriting).

The above EEPROM 50 may be, for example, "AT24PF08" (ATMEL Inc.). The "AT24RF08" has a storing area of 1 kB (128 bytes 8 blocks). In order to control the attribute of each block, PBx bits (x=0 to 7) and an SBx bit (x=0 to 7) are provided for the block. The PBx bits (Protection Bits) consists of 2 bits and the value of each PBx bit has the following meaning.

00b: No Access Permitted

01b: No Access Permitted

10b: Read Only

11b: Read/write-No Access Constrains for Data

The SBx bit (Sticky Bit) consists of one bit and the value of the SBx bit has the following meaning.

0b: The PBx bit cannot be updated from software.

1b: The PBx bit can be updated from software.

In the "AT24RF08," the PBx bit is set to 11b and the SBx bit is set to 1b by the hardware when the computer system 10 is powered. Consequently, the "AT24RF08," just after the computer system 10 is powered, is ready for reading/writing in all the 8 blocks. And, the PBx bit can be updated at this time. In the case when the PBx bit value in a given block is updated to 00b, 01b, or 10b and the SBx bit value is updated to 0b, the data stored in the block can be locked.

In addition to those shown in FIG. 1, many more electric circuits are required to configure the computer system 10. these circuits are already known by the people concerned and they are not so important substantially for the present invention. The description for them will thus be omitted in this specification. And, in order to avoid redundant and complicated description for the drawings, only part of the connection between hardware blocks is illustrated.

In this example embodiment, a program for realizing the computer controlling method of the present invention is embedded in the BIOS. There are some methods for installing this BIOS in the computer system 10. For example, a setup program for installing the BIOS is stored together with the BIOS body in such a storage medium 60 (see FIG. 1) as a floppy disc or the like. This storage medium 60 is set in the FDD connected to the I/O port 52 of the computer system 10, thereby the CPU 14 is instructed to execute the setup program. Consequently, the BIOS is read sequentially from the storage medium 60 and the read BIOS is stored sequentially in the flash ROM 51, thereby the BIOS installation is done.

Next, a description will be made for an example of the processing executed by a computer controlling program built in the BIOS. The processing is one of the processing realized when the CPU 14 executes the BIOS. At first, a description will be made for the processing for storing a starting factor and such starting-related information as a starting time, etc. with reference to FIG. 2.

Figure 5:
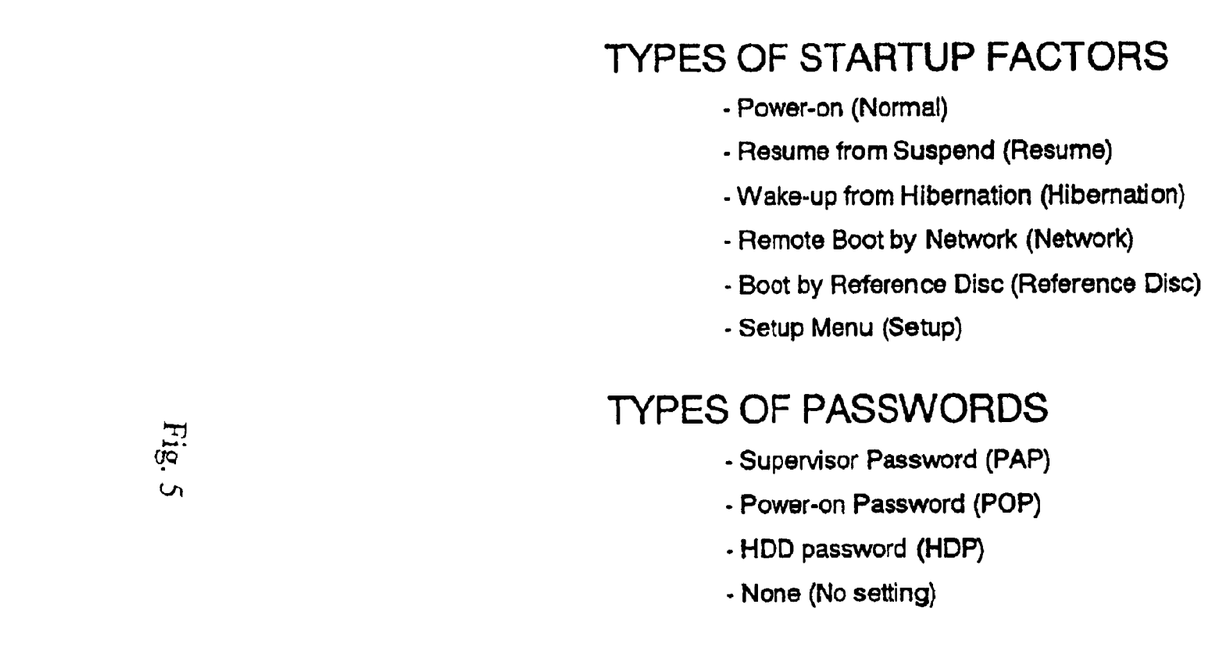
FIG. 5 shows starting factors according to an embodiment of the present invention.

In step 100 (S100 in FIG. 2, and so forth), starting is designated to the computer system 10. Then, the POST (Power On Self Test) program is executed in step 101. In this step 101, the starting factor at the time of instructing the above starting is decided. The computer system 10 has six types of starting factors as shown in FIG. 5; "Power-On," "Resume from Suspend Mode," "Wake-up from Hibernation Mode," "Remote Boot by Network," "Boot by Reference Disc," and "Boot from Setup Menu."

Each starting factor shown in FIG. 5 has the following meaning:

(1) Power-On: The computer system 10 is started up when its power supply is turned on. This is the most general starting factor and it is stored as "Normal" in the EEPROM 50.

(2) Resume from Suspend (resuming from the suspend mode): The computer system 10 is started up when it is resumed from a power saving mode (suspend mode) that stops every operation, thereby limiting the controlling of accesses to files so as to suppress the power consumption of the system. This starting factor is stored as "Resume" in the EEPROM 50.

(3) Wake-up from Hibernation (resuming from the hibernation mode): The computer system 10 is started up when it is resumed from a power saving mode (hibernation mode) that stores data in the computer system 10 and/or data in a memory during an operation of an application in HDD 40. This starting factor is stored as "Hibernation" in the EEPROM 50.

(4) Remote Boot by Network (remote booting by a network): The computer system is started up in response to a start command issued from another computer system via a network. This starting factor is stored as "Network" in the EEPROM 50.

(5) Boot by Reference Disc (booting by a reference disc): The computer system 10 is started up by a disc medium supplied so as to replace the BIOS, etc. with the latest version ones. This starting factor is stored as "Reference Disc" in the EEPROM 50.

(6) Boot by Setup Menu (booting by the setup menu): The computer system is started up so as to install such the software as an operating system (OS), an application program, etc. in the HDD 40 and initialize parameters required for the operations of these programs. This starting factor is stored as "Setup" in the EEPROM 50.

The above starting factors are all present, but other starting factors are expected to appear in the future and the present invention assures these starting factors can also apply thereto. In this embodiment, a starting factor, which is any one of the starting factors shown in FIG. 5, is recognized in step 101.

Figure 2:
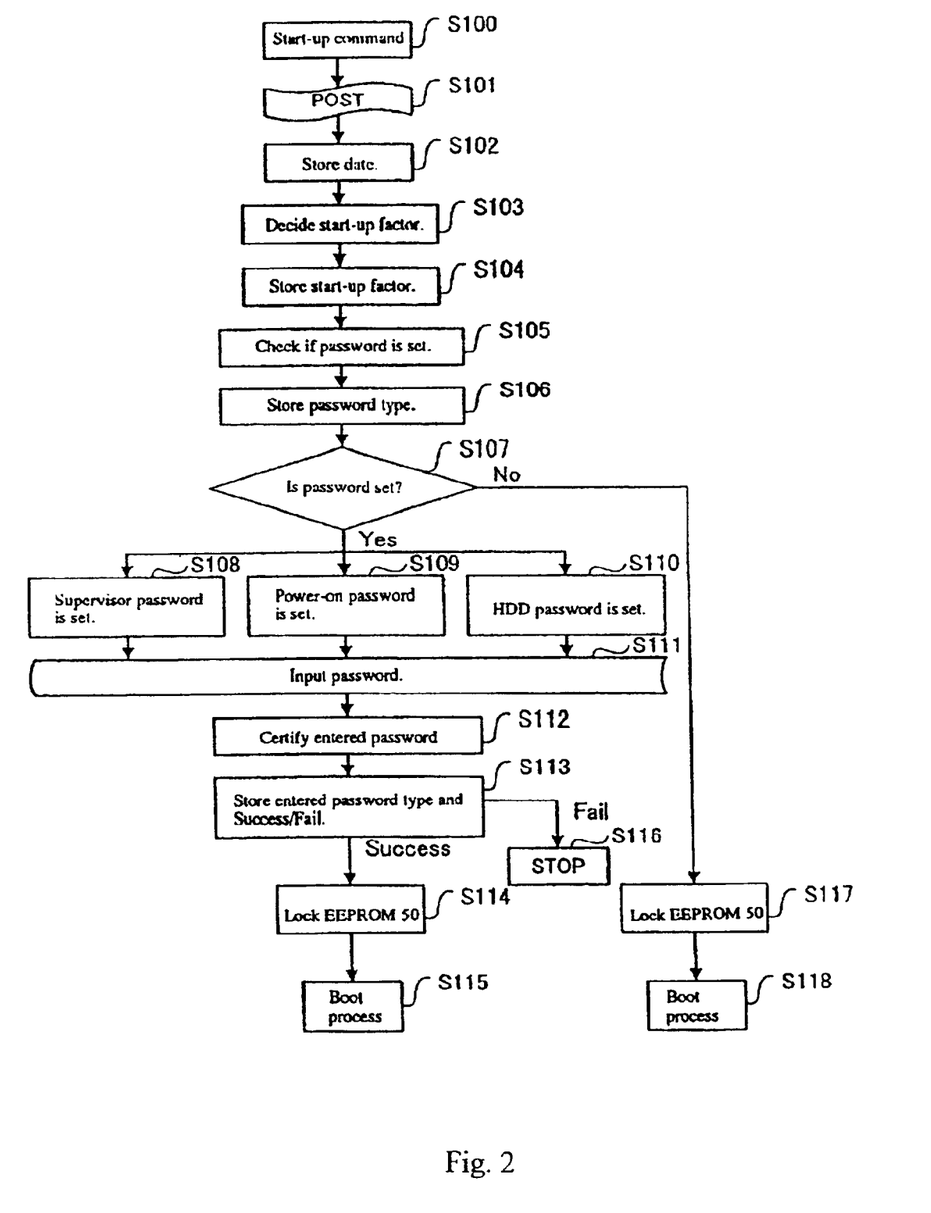
FIG. 2 shows a flowchart of processing for storing a starting factor and information related to the starting including a starting date and time, etc., according to an embodiment of the present invention.

In step 102, the system stores a date and time at which a starting is designated. The date and time is fetched from the real time clock (RTC) described above. This date and time means information including a date (day, month, and year) and a time. This date and time information is stored in a predetermined block of the EEPROM 50.

After the date and time information is stored, the starting factor is decided in step 103, then the decided starting factor is stored in step 104. The decided date and time information is stored in a predetermined block of the EEPROM 50.

After the starting factor is stored in the EEPROM 50, a password set in the computer system 10 is certified. In this embodiment, there are some passwords to be set; "Supervisor Password," "Power-on Password," "HDD Password," and "NONE." The content of each of the above passwords is as shown below.

(1) Supervisor Password: Used to certify a system configuration including a subject network supervisor, etc. This password is stored as "PAP" in the EEPROM 50.

(2) Power-on Password: Held by each certified user of the computer system 10. This password is stored as "POP" in the EEPROM 50.

(3) HDD Password: Requested when accessing the HDD 40. This password is stored as "HDP" in the EEPROM 50.

(4) NONE: Denotes a state in which no password is set. This is stored as "NONE" in the EEPROM 50.

In step 106, the password type confirmed in step 105 is stored in the EEPROM 50. As described above, three passwords of "supervisor password," "power-on password," and "HDD password" might be set in maximum in this embodiment. In such a case, the three passwords of "supervisor password," "power-on password," and "HDD password" are stored as "PAP," "POP," and "HDP" respectively in the predetermined blocks of the EEPROM 50. Note that, however, these passwords are not stored as are, but stored as abbreviations at that time. In the case when there is no password set, "NONE" is stored in the EEPROM 50.

In the case when a password is already set after such the password setting states are stored as described above, the user is requested to input his/her password that agrees to the preset one (steps 107 to 110). For example, the password input prompt message is displayed on the LCD 28. On the other hand, in the case when no password is set, the EEPROM 50 is locked in step 117, then the booting process is executed in step 118. In the case when the EEPROM 50 is "AT24RF08" described above, the PBx bit value in the predetermined block in which the password is stored may be updated to 00b, 01b or 10b and the SPx bit value may be updated to 0b. Consequently, this operation makes it possible to prevent information of a date and time at which a starting factor is stored and information related to the starting factor from overwriting.

In the case when a password is entered in step 111, the password is certified in step 112. This certification result is stored in a predetermined block of the EEPROM 50 in step 113. In the case when the entered password is certified as the registered one (Success), the password type and the certification result (Success) are stored. A password type is any of "supervisor password," "power-on password," and "HDD password." The "supervisor password," the "power-on password," and the "HDD password" are stored respectively as "PAP," "POP," and "HDP" in the EEPROM 50. The certification result is stored as "OK."

In the case when the entered password is not certified (Fail), the fact is stored as "NG" in the EEPROM 50.

In the case when another password is certified after the certification result of the password is stored, the EEPROM 50 is locked just like in step 117. Then, the boot process is executed (steps 114 to 115). In the case when password certification fails (Fail), the processing is stopped (step 116) without executing the boot process. In the boot process (steps 115 and 118), the OS is loaded into the memory, thereby the user can begin an operation.

Figure 3:
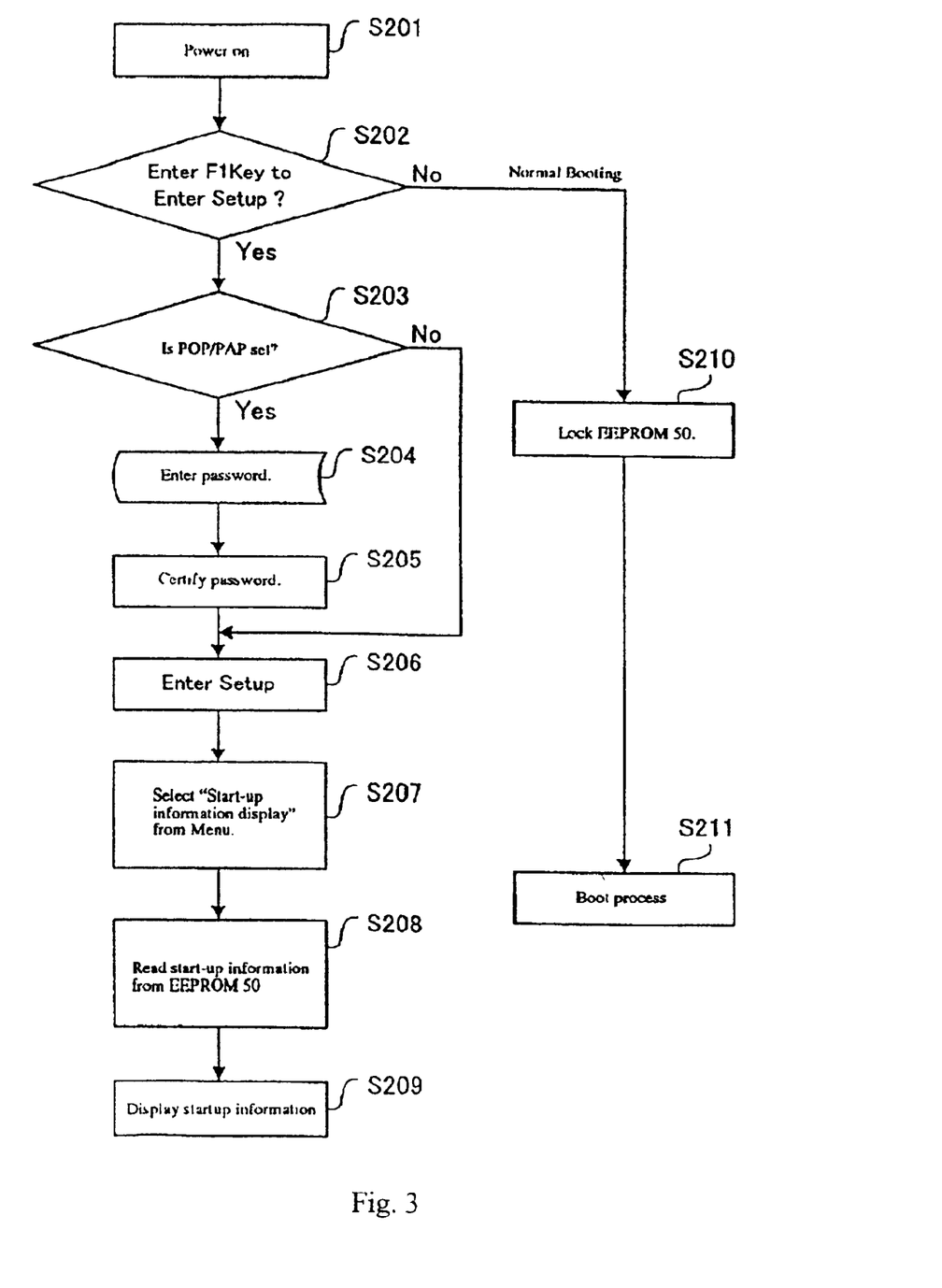
FIG. 3 shows a flowchart of processing for displaying a starting factor and information related to the starting including a starting date and time, etc., according to an embodiment of the present invention.

Next, a description will be made for an example of the processing (to be referred to as this processing) for reading the starting-related information from the EEPROM 50 and displaying it on the LCD 28 with reference to the flowchart shown in FIG. 3.

In step 201, the computer system 10 is powered (power-on), then a message is displayed on the LCD 28 asking if the BIOS is set up or not in step 202. In this embodiment, the BIOS is set up when the user presses the F1 key on the keyboard, which is an input means of the PC 12. Otherwise, the normal boot process is executed.

In the case when the F1 key is pressed, it is decided in step 203 whether or not the supervisor password (PAP) and/or the power-on password (POP) is set. In the case when the password is set, a password input is requested in step 204. In the case when the password is not set, a program for executing this processing is set up in step 206. On the other hand, in case a password is entered in step 204, the password is certified in step 205, then the BIOS is set up in step 206.

After that, the setup menu is displayed on the LCD 28. In this embodiment, an icon "starting information display" is displayed for the menu that displays the starting-related information on the LCD 28. When the icon is selected, the starting-related information is read from the EEPROM 50 in step 208 and the information is displayed on the LCD 28 in step 209.

Figure 4:
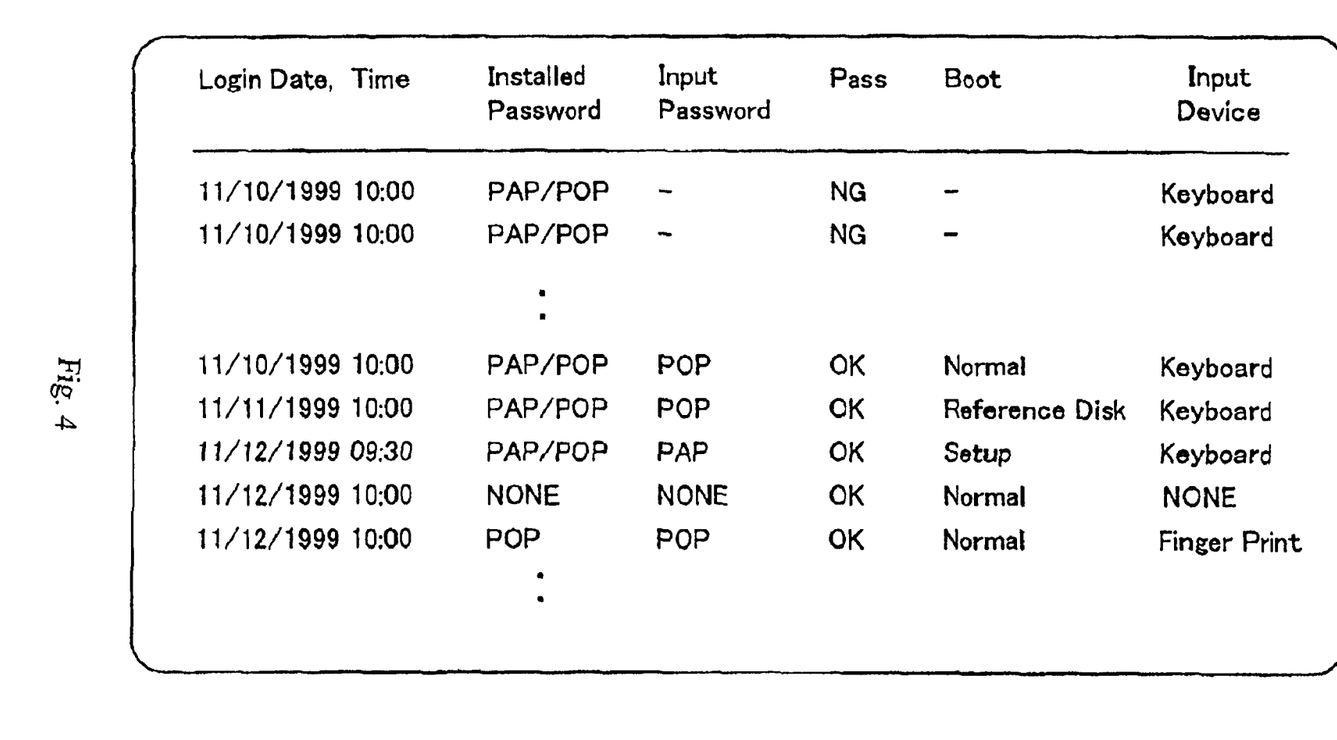
FIG. 4 shows information related to starting according to an embodiment of the present invention.

FIG. 4 shows an example of such a display. In this embodiment, as shown in FIG. 4, the computer system 10 has the six types of starting-related information; "Log in Date, Time," "Installed Password," "Input Password," "Pass," "Boot," and "Input Device" that are related with each another.

The "Log in Date, Time" denotes a date and time at which a starting designation is done. The information includes a time, a day, a month, and a year in the Christian Era.

In the "Installed Password" column are displayed password types set for the computer system 10. In the case when "PAP" is displayed in the "Installed Password" column, the "supervisor password" is set for the computer system 10. In the case when "POP" is displayed in the column, the "power-on password" is set for the computer system 10. "PAP/POP" in the column denotes that both "supervisor password" and "power-on password" are set for the computer system 10. In the case when no password is set for the computer system 10, "NONE" is displayed in the column.

In the "Input Password" column is displayed a password entered in step 111 in FIG. 2. The meanings of both "POP" and "PAP" are as described above. The "-" in the column means that the entered password is not certified, since it is an illegal one. Consequently, this "-" suggests an uncertified password input. The "NONE" displayed in the column means that there is no password set for the computer system 10, thus no password is entered.

In the "Pass" column are displayed password certification results. "NG" is displayed in the case when an illegal password is entered and the password is not certified. The computer system 10 cannot be started up for this password. "OK" is displayed in the case when the entered password is certified or no password is set, thereby the computer system 10 can be started up. It will be understood apparently that the user can get much information about the computer system 10 even only from this "Pass" column.

In the "Boot" column are displayed starting factors. The starting factors, as described with reference to FIG. 5, are the following six types; "Power-On," "Resume from Suspend," "Wake-up from Hibernation," "Remote Boot from Network," "Boot from Reference Disc," and "Setup Menu." For "Power-On," "Normal" is displayed in the column. For "Resume from Suspend," "Resume" is displayed. For "Wake-up from Hibernation," "Hibernation" is displayed. And, for "Remote Boot from Network," "Network" is displayed. For "Boot from Reference Disc," "Reference Disc" is displayed and for "Boot from Setup Menu," "Setup" is displayed respectively.

In the "Input Device" column are displayed devices (input devices) to which a password is entered respectively. The most general input device is a keyboard. However, such an input device may be a system that certifies the user with his/her finger print, voice pattern, and eye ball. For example, in the case when the computer system 10 is connected to a system that resets a password with a read finger print, the finger print can be used to collate and reset a predetermined password in addition to a key input from the keyboard. In such a system, it is important to display the "Input Device" information. In the case when a third person enters a password from the keyboard, it can be recognized as a password leak. And, in the case when a finger print of a third person is entered from a finger print reader, it can be recognized as a forged finger print. FIG. 4 shows an example in which a keyboard and a finger print are registered for the "Input" Device" column.

Hereunder, a description will be made for some concrete examples of the method for deciding whether or not the computer system 10 is accessed illegally according to the information displayed on the LCD 28.

EXAMPLE 1

Figure 6:
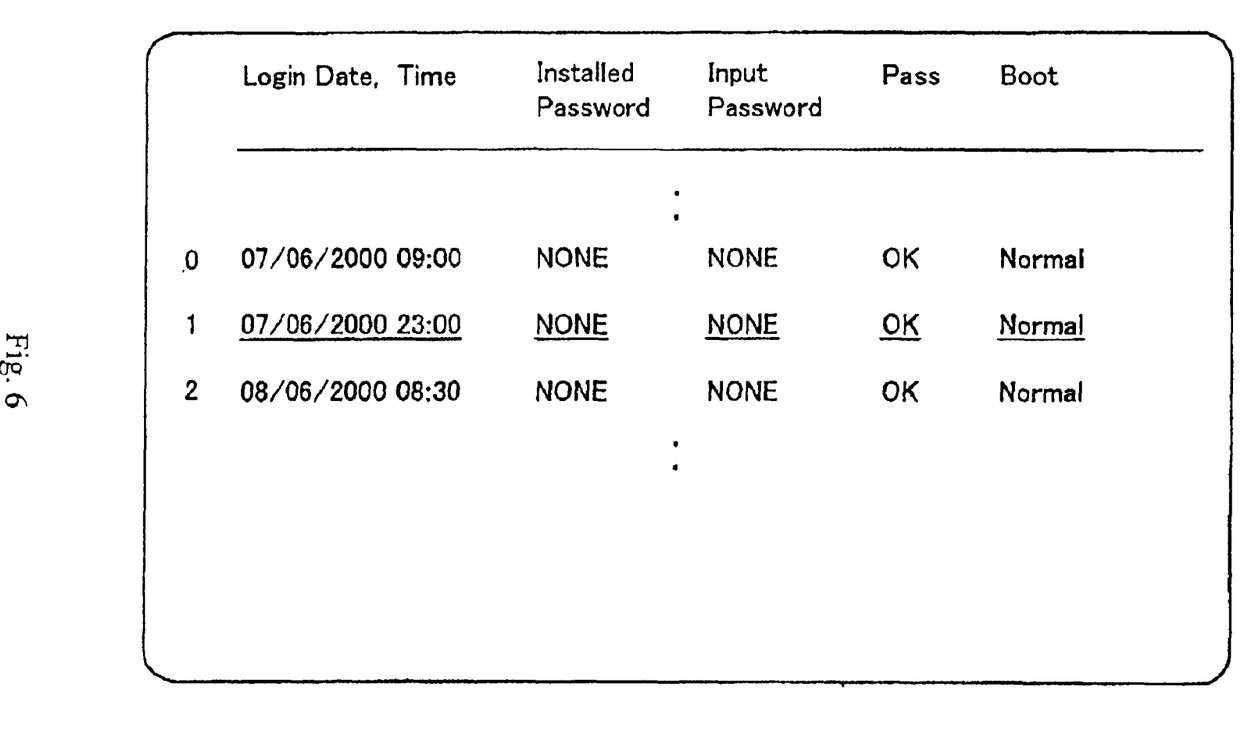
FIG. 6 shows a screen displayed in Example 1, according to the present invention.

FIG. 6 shows an embodiment example 1, displayed on the LCD 28. Meanings of the items such as "Login Date, Time," etc. shown in FIG. 6 are the same as those shown in FIG. 4. The code numbers 0, 1, and 2 displayed at the left end are just added for describing the example 1 for convenience' sake. They do not denote the displayed items specially. This is also true for the examples to be described later.

Example 1 is a case in which no password is set for the computer system 10.

Because no password is set in Example 1 shown in FIG. 6, "NONE" is displayed in the "Installed Password" and "Input Password" columns. Assume now that the computer system 10 was started up at 9:00, Jun. 7, 2000 and at 8:30, Jun. 8, 2000 by a certified user respectively.

Consequently, the information related to the starting at 23:00, Jun. 7, 2000 denoted by a code 1 suggests that the system 10 is accessed illegally by a third person other than certified users. Therefore, the user, at the time of knowing this display, can check if his/her data in the computer system 10 is rewritten or erased. On the contrary, in the case when such the information as shown in FIG. 6 is not displayed, the user will continue his/her work without knowing the fact that his/her data in the computer system 10 is rewritten or erased. Especially, as shown in FIG. 6, the information in this column is very effective to check illegal accesses to the computer system 10, since starting information items recorded on the basis of the same starting factor are related with each another and they are displayed as history data in order of date and time information.

EXAMPLE 2

Figure 7:
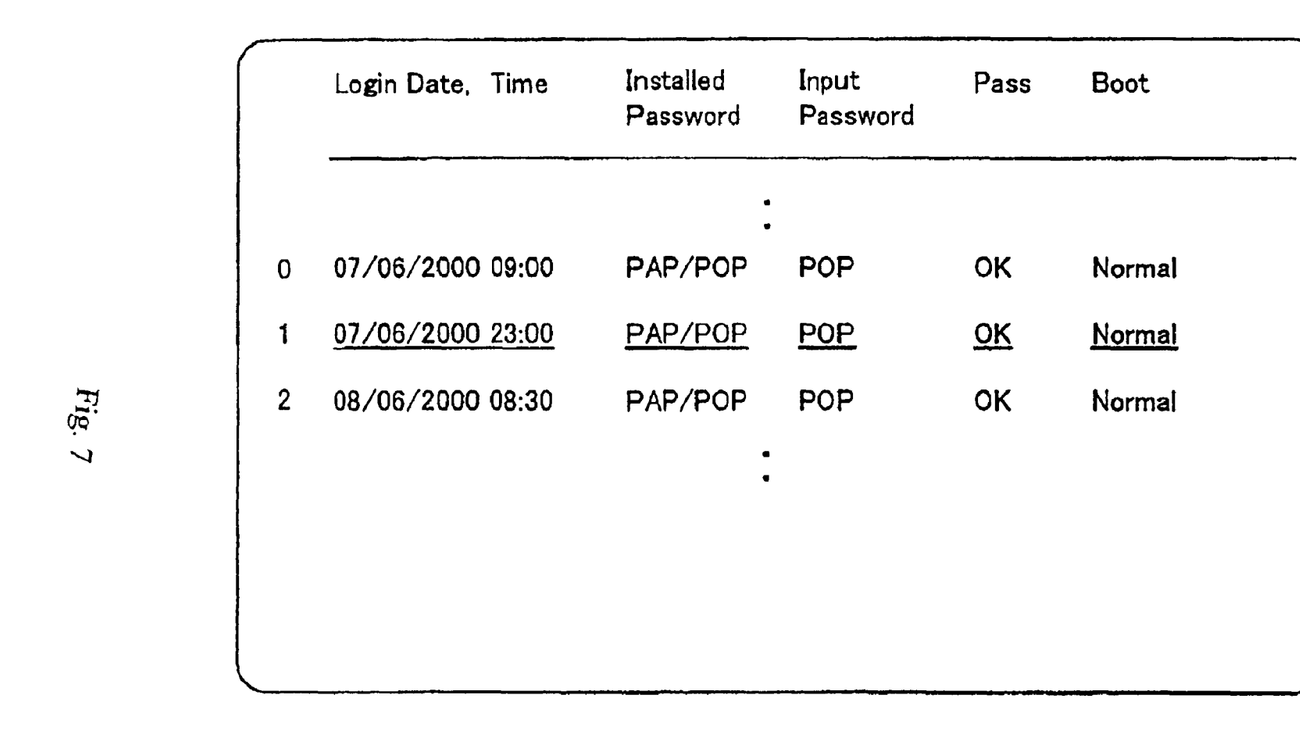
FIG. 7 shows a screen displayed in Example 2, according to the present invention.

Embodiment Example 2 describes a case in which two passwords of "supervisor password" and "power-on password" are set for the computer system 10. As shown in FIG. 7, after the computer system 10 was started up at 9:00, Jun. 7, 2000, it was also started at 23:00 on the same day in the example 2. In addition, the computer system 10 was started up again at 8:30, Jun. 8, 2000. Assume now that a certified user started up the computer system 10 at 9:00, Jun. 7, 2000 and at 8:30, Jun. 8, 2000. Consequently, the display shown in FIG. 7 suggests that a third person started up the computer system 10 at 23:00, Jun. 7, 2000 denoted by code 1.

A certified user of the computer system 10 can know that his/her data in the HDD 40 might be rewritten or erased, since a third person accessed the system 10. The certified user can also know according to the starting-related information denoted by code 1 that the third person entered "POP," that is, the "power-on password." Consequently, the user can know that the "power-on password" is leaked. According to this information, therefore, the certified user will know that the "power-on password" must be changed. In the case when the certified user knows that the data in the HDD 40 is rewritten first, the user can know from a screen shown in FIG. 7 that the data in the HDD 40 is rewritten by a person who has obtained the leaked "POP" password.

EXAMPLE 3

Figure 8:
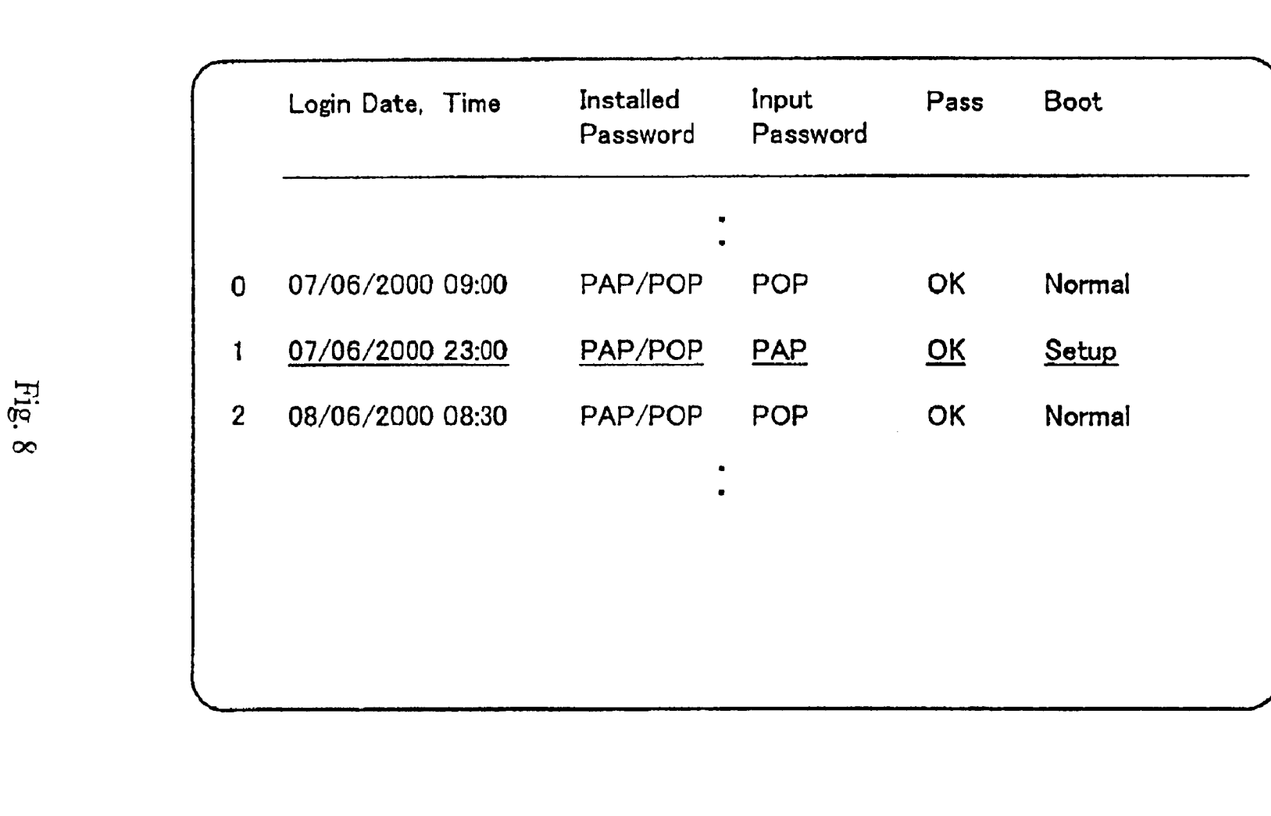
FIG. 8 shows a screen displayed in Example 3, according to the present invention.

Just like in Example 2, embodiment Example 3 denotes a case in which two passwords "supervisor password" and "power-on password" are set for the computer system 10.

In FIG. 8, assume that the computer system 10 was started up by a certified user at 9:00, Jun. 7, 2000 and at 8:30, Jun. 8, 2000. The user entered a password "POP," that is, "power-on password."

The information related to the starting at 23:00, Jun. 7, 2000 denoted by code 1 denotes that the entered password is "PAP," that is, "supervisor password." Consequently, it is estimated that the supervisor started up the computer system 10 or the "supervisor password" was leaked and the computer system 10 was started up by a third person who obtained the leaked password. And, it is possible to ask the supervisor if he/she started up the computer system 10 on June 7. In the case when the supervisor did not start up the system 10 on that day, it is confirmed that the PAP password is leaked.

The starting denoted by code 1 in the "Boot" column denotes "Setup." The user can thus know that the startup device of the computer system 10 has been changed.

EXAMPLE 4

Embodiment example 4 premises that the computer system 10 is infected by a computer virus, thereby the OS cannot be started up. The starting-related information is displayed on the LCD 28 in the case when the OS is not started up even when a certified user powers the computer system 10. The display goes on as shown in the flowchart in FIG. 3. And, because the flowchart shown in FIG. 3 is executed by a program built in the BIOS, it is possible to display predetermined information on the LCD 28 even when the OS is infected by a computer virus.

Figure 9:
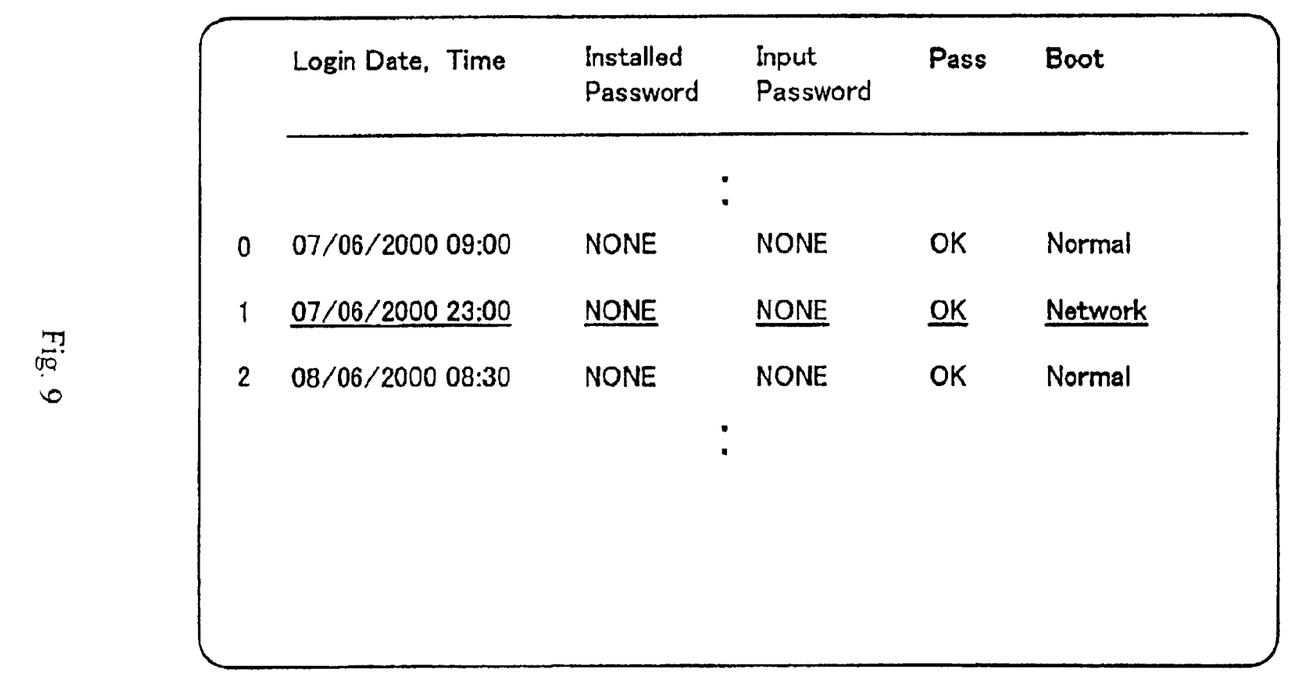
FIG. 9 shows a screen displayed in Example 4, according to the present invention.

FIG. 9 shows a screen displayed in example 4. The screen displays certified user's starting-related information denoted by codes 0 and 2. The information denoted by code 1 includes "Network" in the "Boot" column. In the case when the OS is not started up as denoted by code 2, the OS might be infected by a computer virus via a network during the starting denoted by code 1. At this time, it is also confirmed that the operation of the computer system 10 had been normal before the starting denoted by code 0 was done.

As described above, this embodiment employs five types of preferred starting-related information items; "Login Date, Time," "Installed Password," "Input Password," "Pass," and "Boot." these information items are stored in the EEPROM 50, which is storage means, and displayed on the LCD 28. For this present invention, however, any of these information items may be selected as needed. Concretely, any one of the above five information items can be selected so as to be stored in the EEPROM 50 and displayed on the LCD 28. Even when only the "Login Date, Time" is stored and displayed as described above, it is possible for a certified user to know an illegal access of a third person to the computer system 10 if the user remembers the date and time at which the user started up the system 10. In the case when any of the above five information items are combined properly, it is also possible for the certified user to know an illegal access of a third person to the computer system 10. And, the starting-related information items are not limited only to these five items; existing items or those to appear in the future may also be employed. In addition, although password types are used in this embodiment, passwords themselves may be stored and displayed as described above.

In this embodiment described above, a laptop PC 12 has been employed. The present invention, however, may apply to other information apparatuses widely; for example, the present invention can apply to not only desktop personal computers and other type computers, but also to information apparatuses in which a computer is built in respectively. Such an information apparatus may be, for example, a PDA (Personal Digital Assistants), a portable telephone, a PDA provided with portable telephone functions, or the like.

Furthermore, in this embodiment described above, notice messages to a user are displayed on the LCD 28, but the present invention is not limited only to that method; for example, the messages may be notified with voices and/or printed out.

[Advantages of the Invention]

As described above, according to the present invention, a certified user of such an information apparatus as a computer can know an illegal access of a third person to the apparatus, thereby the user can recognize that the apparatus might be used illegally or set values of the apparatus might be modified.

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context is meant to include any expression, in any language, code or notation, of a set of instructions intended to cause a system having an information processing capability to perform a particular function either directly or after either or both of the following a) conversion to another language, code or notation; b) reproduction in a different material form.

Thus the invention includes an article of manufacture comprising a computer usable medium having computer readable program code means embodied therein for causing a function described above. The computer readable program code means in the article of manufacture comprising computer readable program code means for causing a computer to effect the steps of a method of this invention.

Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention.

Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer controlling method comprising the steps of:
    obtaining a starting factor instruction for said computer and based upon said starting factor, obtaining information related to an environment in which said starting factor is instructed, and storing said starting factor and said information in a computer having a non-volatile memory that can be locked;
    and wherein said starting factor of said computer is a starting factor selected from the group consisting of booting by normal power on, resuming from a power saving mode, remote booting by a network, booting by a reference diskette, and booting from a setup menu;
    notifying a user of said starting factor and said information when said computer is started up next.

2. The computer controlling method according to claim 1 wherein the starting factor of said computer and said information related to said environment are related to each other in said notification.

3. The computer controlling method according to claim 2 wherein said information related to said environment includes information for a date and time at which said computer's starting factor is instructed, and
    said step of notifying includes conducting said notification so that said starting factor of said computer and said information related to said environment are related to each other and displayed at display means according to an order of date and time information.

4. The computer controlling method according to claim 3 wherein said environment in which said starting factor is instructed, includes a type of identification information related to a user of said computer.

5. The computer controlling method according to claim 4 wherein said environment in which said starting factor is instructed, includes information related to a device to which said identification information is to be entered.

6. The computer controlling method according to claim 5 wherein said information in said environment in which said starting factor is instructed includes information for suggesting an input of uncertified identification information.

7. An apparatus comprising:
    a storage unit having a secure non-volatile memory that can be locked:
    a power on starting factor managing unit for recognizing a starting factor instruction to said apparatus, and for storing said starting factor in said storage unit;
    said starting factor being selected from the group consisting of booting by normal power on, resuming from a power saving mode, remote booting by a network, booting by a reference diskette, and booting from a setup menu;
    a permission whether said starting factor is operated, is registered in a Set up menu in BIOS according to a priority level of a user;
    a date and time information managing unit for storing information of a date and time when said starting factor is instructed into said storage unit; and
    a notifying unit for notifying a user of said starting factor, said said date and said time stored in said storage unit.

8. The apparatus according to claim 7, further including an identification information managing unit for certifying identification information of a person who has made the instruction, for discriminating the type of said information, and for storing said discriminated type of said identification information is said storage unit, and wherein said notifying unit notifies said user the type of said identification information.

9. A computer comprising:

a storage unit having a secure non-volatile memory that can be locked;

date and time information managing unit for storing in said storage unit, date and time information as to when each starting factor was instructed to said computer;

said date and time information managing unit operate on a basic input/output system of said computer and, said starting factor being selected from the group consisting of booting by normal power on, resuming from a power saving mode, remote booting by a network, booting by a reference diskette, and booting from a setup menu;

an identification information managing unit for discriminating a type of identification information entered when said computer is started up and storing said type of identification information in said storage unit, said unit serving to certify passwords selected from the group consisting of "Supervisor Password," "Power on Password," "HDD Password" and "None," stored as "PAP," "POP" and "HDP" in predetermined blocks in said storage unit and to distinguish among said passwords to show the priority level of an user; and a display unit for displaying at least said date and time information stored in said storage unit.

10. The computer according to claim 9, wherein said identification information managing unit stores a predetermined type of identification information and discriminates among a plurality of said types of entered identification information, and, said display unit displays (a) said date and time information, (b) a type of identification information registered beforehand, and (c) a particular type of entered identification information so as to relate the particular type of identification information with the type of entered identification information.

11. The computer according to claim 10 wherein said computer further includes a starting factor managing unit for recognizing the starting factor for said computer and for storing said starting factor in said storage unit, said display unit displays said date and time information, said type of identification information registered beforehand, said type of said entered identification information, and said starting factor so that each is related with each other.

12. The computer according to claim 11, further comprising an input unit for instructing a predetermined process, and wherein said display unit further displays a history of a plurality of information related to said starting factor.

13. The computer according to claim 12, wherein said information related to said starting factor includes information related to a date and time at which starting of said computer is instructed and the type of said identification information entered to said computer.

14. A computer comprising:

a storage unit having a secure non-volatile memory that can be locked;

a managing unit for storing in said storage unit a power-on starting factor instructed to said computer, wherein said starting factor of said computer is a starting factor selected from the group consisting of booting by normal power on, resuming from a power saving mode, remote booting by a network, booting by a reference diskette, and booting from a setup menu said managing unit also obtaining and controlling the environment information including "Login date and time," "Installed Passwords," "Input Password," "Pass/or not" and "Boot" and relating a priority level information to an environment in which said starting factor is instructed;

a reading unit for reading said starting factor and said information related to an environment from said storage unit while a basic input/output system BIOS of said computer is operating said unit controlling access permission for reading in compliance with said priority level of a user; and a display unit for displaying said starting factor and said information related to an environment read by said reading unit.

15. The computer according to claim 14 wherein said reading unit reads said starting factor and said information related to an environment according to an instruction from the setup menu of said basic input/output system BIOS.

16. A control method comprising the steps of:

storing a program used to enable said computer to execute a plurality of processes including, the steps of:

obtaining a starting factor instruction for said computer and information related to an environment in which said starting factor is instructed;

storing said starting factor of said information in a computer having a non-volatile memory that can be locked;

and wherein said starting factor of said computer is a starting factor selected from the group consisting of booting by normal power on, resuming from a power saving mode, remote booting by a network, booting by a reference diskette, and booting from a setup menu;

reading said starting factor and said information related to said environment;

notifying a user of said starting factor and said information when said computer is started up next.

17. An article of manufacture comprising a computer usable medium having computer readable program code means embodied therein for causing computer control, the computer readable program code means in said article of manufacture comprising computer readable program code means for causing a computer to effect the steps of claim 1.

18. An article of manufacture comprising a computer usable medium having computer readable program code means embodied therein for causing computer control, the computer readable program code means in said article of manufacture comprising computer readable program code means for causing a computer to effect the steps of claim 16.

19. An article of manufacture comprising a computer usable medium having computer readable program code means embodied therein for causing computer control, the computer readable program code means in said article of manufacture comprising computer readable program code means for causing a computer to effect the steps of claim 7.

* * * * *